US008549172B2

(12) United States Patent
Kessler et al.

(10) Patent No.: US 8,549,172 B2
(45) Date of Patent: Oct. 1, 2013

(54) DISTRIBUTION OF SOFTWARE BASED ON SCHEDULED TIME TO DEPLOY SOFTWARE DYNAMIC RESOURCE STATE OF SYSTEMS INVOLVED IN DEPLOYMENT OF SOFTWARE AND BASED UPON ENVIRONMENTAL CONDITIONS

(75) Inventors: Carl Shawn Kessler, Austin, TX (US); Giovanni Lanfranchi, Piacenza (IT); David Bruce Lindquist, Raleigh, NC (US); Bala Rajaraman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1859 days.

(21) Appl. No.: 11/208,298

(22) Filed: Aug. 19, 2005

(65) Prior Publication Data

US 2007/0043831 A1     Feb. 22, 2007

(51) Int. Cl.
*G06F 15/16* (2006.01)
*G06F 3/00* (2006.01)

(52) U.S. Cl.
USPC ......................................... 709/238; 709/219

(58) Field of Classification Search
USPC ................................... 709/238, 219
See application file for complete search history.

(56) References Cited

U.S. PATENT DOCUMENTS

| | | | | |
|---|---|---|---|---|
| 5,005,122 A * | 4/1991 | Griffin et al. | ................ | 709/203 |
| 5,410,703 A * | 4/1995 | Nilsson et al. | ................ | 717/168 |
| 5,655,081 A * | 8/1997 | Bonnell et al. | ................ | 709/202 |
| 5,805,897 A * | 9/1998 | Glowny | ................ | 717/178 |
| 5,845,090 A * | 12/1998 | Collins et al. | ................ | 709/221 |
| 5,933,647 A * | 8/1999 | Aronberg et al. | ................ | 717/178 |
| 6,192,518 B1 * | 2/2001 | Neal | ................ | 717/175 |
| 6,199,193 B1 | 3/2001 | Oyagi et al. | ................ | 717/1 |
| 6,289,511 B1 * | 9/2001 | Hubinette | ................ | 717/173 |
| 6,347,398 B1 * | 2/2002 | Parthasarathy et al. | ........ | 717/178 |
| 6,631,517 B1 | 10/2003 | Lamping et al. | ................ | 717/151 |
| 6,662,217 B1 * | 12/2003 | Godfrey et al. | ................ | 709/219 |
| 6,865,737 B1 | 3/2005 | Lucas et al. | ................ | 717/178 |
| 6,975,594 B1 * | 12/2005 | Byers | ................ | 370/238 |
| 6,983,449 B2 * | 1/2006 | Newman | ................ | 717/121 |
| 2002/0091994 A1 | 7/2002 | McCready et al. | ................ | 717/124 |
| 2002/0152290 A1 * | 10/2002 | Ritche | ................ | 709/221 |
| 2003/0005427 A1 * | 1/2003 | Herrero | ................ | 717/178 |
| 2003/0009754 A1 | 1/2003 | Rowley et al. | ................ | 717/177 |
| 2003/0018952 A1 | 1/2003 | Roetzheim | ................ | 717/101 |
| 2003/0033402 A1 * | 2/2003 | Battat et al. | ................ | 709/224 |
| 2003/0056151 A1 | 3/2003 | Makiyama | ................ | 714/38 |
| 2003/0084157 A1 | 5/2003 | Graupner et al. | ................ | 709/226 |
| 2003/0182652 A1 | 9/2003 | Custodio | ................ | 717/122 |

(Continued)

*Primary Examiner* — Moustafa M Meky
*Assistant Examiner* — Blake Rubin
(74) *Attorney, Agent, or Firm* — Robert A. Voigt, Jr.; Winstead, P.C.

(57) ABSTRACT

A method, computer program product and network management server for distributing software. The network management server receives a request to deploy an application on a designated target client station at a designated scheduled time. The network management server determines whether to deploy the application on the designated target client station at the designated time based on the resource state of the systems involved in the deployment of the software (e.g., processor usage of the network management server, processor usage of the target client station) as well as the environmental conditions (e.g., bandwidth usage, time of day pricing for connectivity at scheduled time, work orders on the target client station). By taking into consideration the dynamic resource state of the systems involved in the deployment of the software as well as the environmental conditions, software may be deployed on the client stations by the network management server more effectively.

19 Claims, 7 Drawing Sheets

(56) References Cited

U.S. PATENT DOCUMENTS

| | | | |
|---|---|---|---|
| 2003/0182656 A1* | 9/2003 | Leathers et al. | 717/177 |
| 2003/0204791 A1 | 10/2003 | Helgren et al. | 714/48 |
| 2004/0014479 A1* | 1/2004 | Milman | 455/457 |
| 2004/0045013 A1 | 3/2004 | Lam | 719/328 |
| 2004/0261053 A1 | 12/2004 | Dougherty et al. | 717/101 |
| 2005/0192979 A1* | 9/2005 | Keller et al. | 707/100 |
| 2005/0289536 A1* | 12/2005 | Nayak et al. | 717/174 |
| 2006/0075087 A1* | 4/2006 | Kaiser et al. | 709/224 |
| 2007/0169113 A1* | 7/2007 | Moore et al. | 717/174 |
| 2009/0055795 A1* | 2/2009 | Finlayson et al. | 717/101 |

* cited by examiner

DISTRIBUTION OF SOFTWARE BASED ON SCHEDULED TIME TO DEPLOY SOFTWARE DYNAMIC RESOURCE STATE OF SYSTEMS INVOLVED IN DEPLOYMENT OF SOFTWARE AND BASED UPON ENVIRONMENTAL CONDITIONS

TECHNICAL FIELD

The present invention relates to the field of software distribution on a data transmission network, and more particularly to distributing software on a data transmission network based on the scheduled time to deploy the software, the dynamic resource state of the systems involved in the deployment of the software as well as based upon environmental data, e.g., network bandwidth, work order tickets, time of day pricing for connectivity.

BACKGROUND INFORMATION

Traditional mainframe computer configurations provided for user interface to the computer through computer terminals which were directly connected by wires to ports of the mainframe computer. As computing technology has evolved, processing power has typically evolved from a central processing center with a number of relatively low-processing power terminals to a distributed environment of networked processors. Examples of this shift in processing include local or wide area computer networks which interconnect individual workstations where each workstation has substantial independent processing capabilities. This shift may be further seen in the popularity of the Internet which interconnects many processors and networks of processors through devices such as, for example, routers. This type of network environment is often referred to as a client-server environment with client stations coupled to and supported by one or more server stations.

In the modern distributed processing computer environment, control over software, such as application programs, is more difficult than where a mainframe operated by an administrator is used, particularly for large organizations with numerous client stations and servers distributed widely geographically and utilized by a large number of users. Furthermore, individual users may move from location to location and need to access the network from different client stations at different times. The networked environment increases the challenges for a network administrator in maintaining proper licenses for existing software and deploying new or updated applications programs across the network.

One such distributed network environment where new or updated application programs are deployed across the network includes a server, referred to as a network management server, configured to deliver software applications (such as upgrades and patches) to computers, referred to as client stations, via one or more other servers. Typically, the network management server installs the software on these client stations based solely on a pre-determined schedule. For example, the network management server may install upgrades to the client stations at a particular time of day, e.g., 3 am on a Saturday. However, the network management server does not consider what is termed herein as the "resource state" of the systems involved in the deployment of the software, such as the processor usage of the network management server or the processor usage of the target client station. Further, the network management server does not consider what is termed herein as "environmental conditions" such as network capability (e.g., bandwidth usage), access (e.g., time of day pricing structure for connectivity,) and performance problems with the client stations (e.g., work order ticket to correct a problem that the user of the client station is experiencing).

By not considering the resource state of the systems involved in the deployment of the software or the environmental conditions, the network management server may deploy an application to a client station when it may be an inopportune time. For example, the network management server may be scheduled to deploy an application onto a client station at 15:00 hours on Saturday. However, if the network management server or one of the servers through which the application is being deployed is experiencing at that time a virus attack, then it may be advantageous to delay the deployment of the software when the server is more capable of handling the deployment. Referring to the above example, if the target client station is currently experiencing performance problems at 15:00 hours on Saturday, then it may be advantageous to delay the deployment of the software until when the target client station is more capable of handling the deployment.

Hence, if the resource state of the systems involved in the deployment of the software and environmental conditions were taking into consideration, then software may be deployed on the client stations by the network management server more effectively. Other benefits may include reduction in outages, better end user performance and so forth.

Therefore, there is a need in the art to deploy software based upon the scheduled time to deploy the software, the dynamic resource state of the systems involved in the deployment of the software as well as based upon the environmental conditions.

SUMMARY

The problems outlined above may at least in part be solved in some embodiments by determining whether to deploy the software application on a client station taking into consideration the dynamic resource state of the systems involved in the deployment of the software (e.g., processor usage of the network management server, processor usage of the client station) as well as the environmental conditions (e.g., bandwidth usage, time of day pricing for connectivity at scheduled time, work orders on the client station). By taking into consideration the dynamic resource state of the systems involved in the deployment of the software as well as the environmental conditions, software may be deployed on the client stations by the network management server more effectively.

In one embodiment of the present invention, a method for distributing software may comprise the step of receiving a request to deploy an application on a designated target client station at a designated scheduled time. The method may further comprise determining whether to deploy the application on the designated target client station at the designated time based on a resource state of the designated target client station and a network management server as well as based on environmental conditions. The environmental conditions are used to determine how opportune the deployment of the application on the designated target client station at the designated scheduled time is.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and network management server for distributing software. In one embodiment of the present invention, the network management server receives a request to deploy an application on a designated target client station at a designated scheduled time. The network management server determines whether to deploy the application on the designated target client station at the designated time based on the resource state of the systems involved in the deployment of the software (e.g., processor usage of the network management server, processor usage of the target client station) as well as the environmental conditions (e.g., bandwidth usage, time of day pricing for connectivity at scheduled time, work orders on the target client station). By taking into consideration the dynamic resource state of the systems involved in the deployment of the software as well as the environmental conditions, software may be deployed on the client stations by the network management server more effectively.

It is noted that even though the following discusses the network management server as determining whether to deploy a software application on a designated target client station at a designated time that the principles of the present invention may be applied to any other system involved in the deployment of the application on the client station, such as an on-demand server. It is further noted that a person of ordinary skill in the art would be capable of applying the principles of the present invention to such systems involved in the deployment of the application. It is further noted that embodiments for deploying applications on client stations by other such systems, e.g., on-demand server, would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
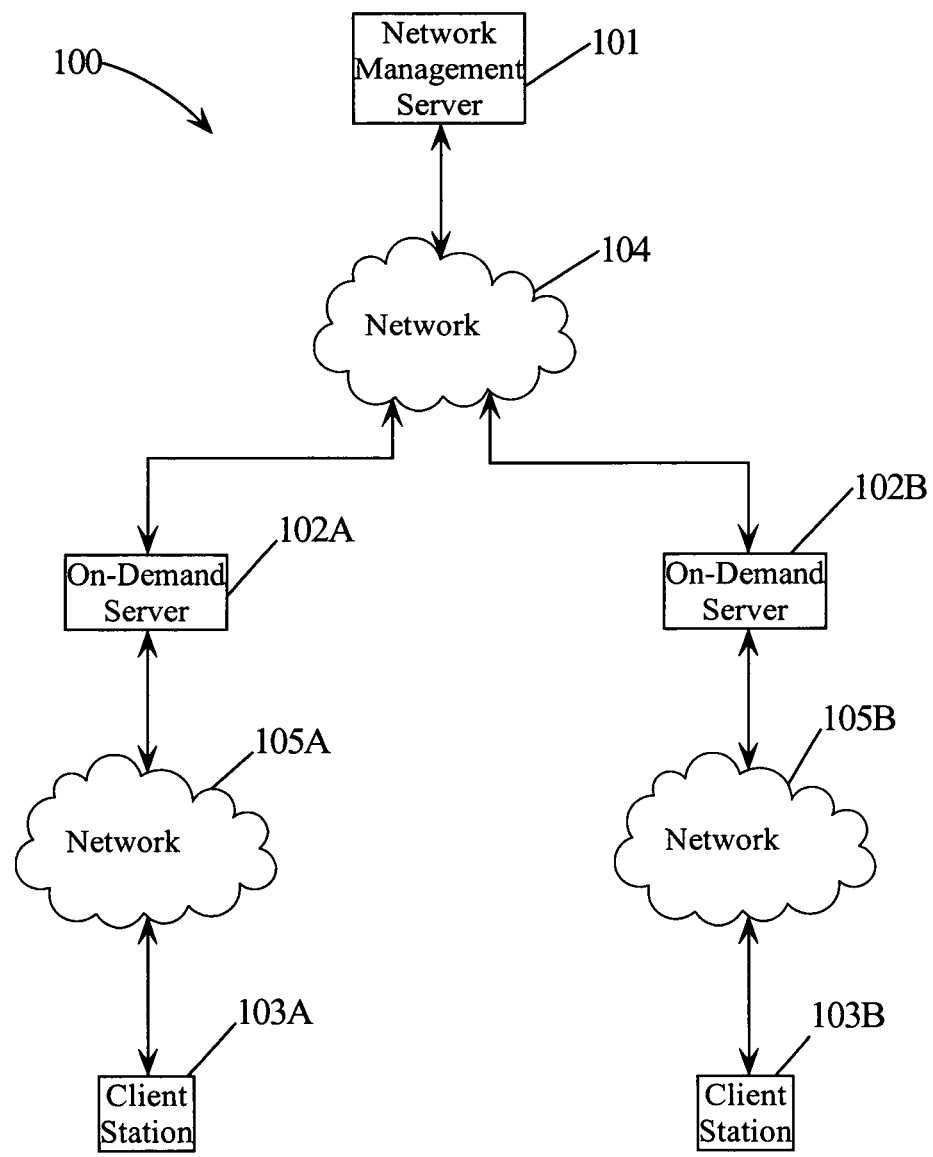
FIG. 1 illustrates a network system in accordance with an embodiment of the present invention.

FIG. 1—Network System

FIG. 1 illustrates a network system 100 configured in accordance with an embodiment of the present invention. Network system 100 includes a network management server 101. A detail description of network management server 101 is provided below in association with FIG. 2. Network system further includes on-demand servers 102A-B. On-demand servers 102A-B may collectively or individually be referred to as on-demand servers 102 or on-demand server 102, respectively. As used herein, "on-demand" refers to a server delivering applications as needed responsive to user requests as requests are received. A detail description of on-demand servers 102 is provided below in association with FIG. 2. Network system 100 further includes client stations 103A-B. Client stations 103A-B may collectively or individually be referred to as client stations 103 or client station 103, respectively. A detail description of client stations 103 is provided further below in association with FIG. 3. As illustrated in FIG. 1, on-demand servers 102 are connected to network management server 101 over a first network segment 104. Client station 103A is served by on-demand server 102A and communicates over network 105A. Similarly, client station 103B is served by server 102B and communicates over network 105B. As schematically illustrated in FIG. 1, client stations 103 may be a variety of different hardware operating a variety of different operating systems. It is noted that network system 100 may include any number of client stations 103, on-demand servers 102 and any number of segments of networks and that FIG. 1 is illustrative. It is further noted that the present invention is not to be limited in scope to the particular features illustrated in FIG. 1.

Referring to FIG. 1, network system 100, as illustrated in FIG. 1, is a centrally managed computer network with network management server 101 acting as the central administration station executing network management software, e.g., TME 10 from Tivoli Systems, Inc. Servers 102 act as on-demand servers for their respective associated client stations 103 and provide for client/server application support. It is further to be understood that networks 104, 105A and 105B may be separate physical networks, separate partitions of a single physical network or may be a single network. Furthermore, network management server 101 may be configured to allow for direct communication between server network management server 101 and client stations 103. In addition, a single machine may be configured to include a client, an on-demand server and/or a network (system) management server.

As will be described further herein with reference to the flowcharts, network management server 101 provides a means for software distribution (e.g., patches, updates) in network system 100. Furthermore, on-demand servers 102 each provide an application management system for managing configurable application programs using both user and administrative preferences for various application programs.

Figure 4:
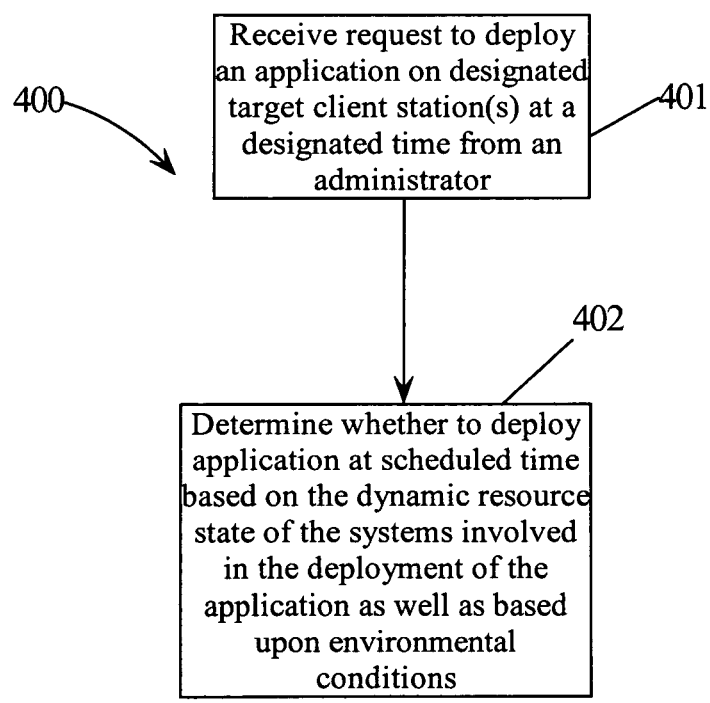
FIG. 4 is a flowchart of a method for distributing software in accordance with an embodiment of the present invention.
Figure 5:
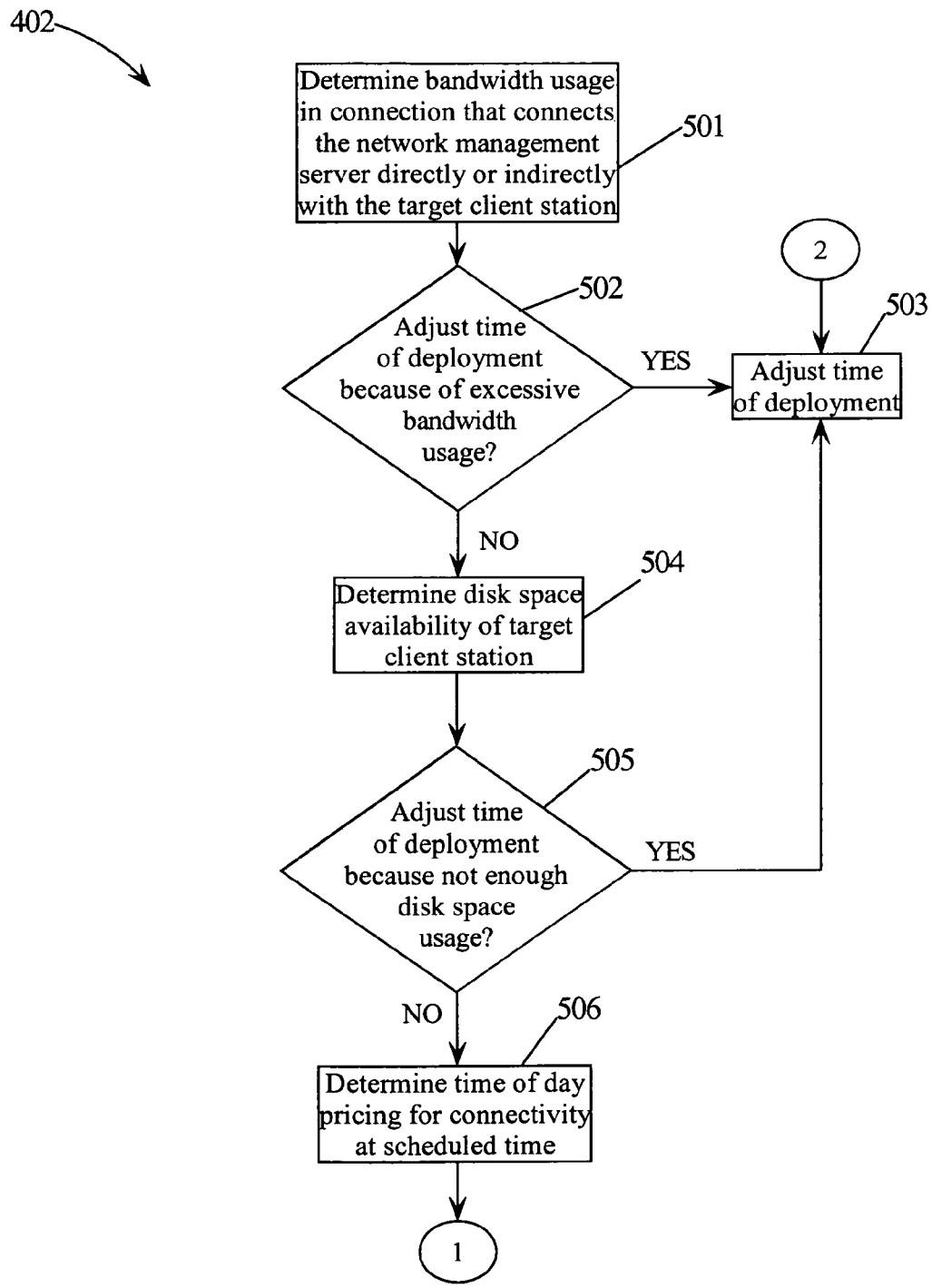
FIG. 5 is a flowchart of the sub-steps of the step for determining whether to deploy the software at the schedule time in accordance with an embodiment of the present invention.
Figure 5:
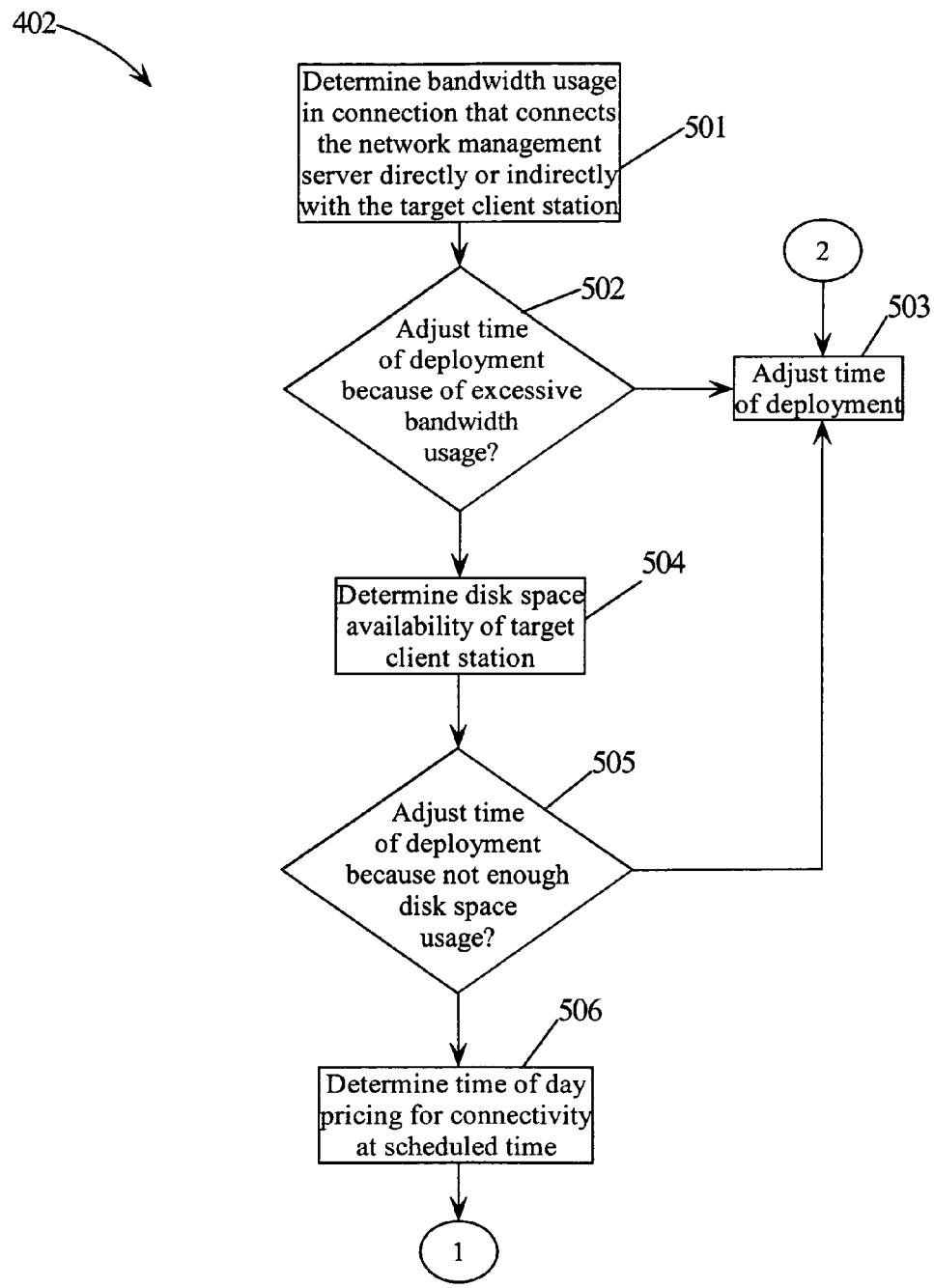
Figure 5:
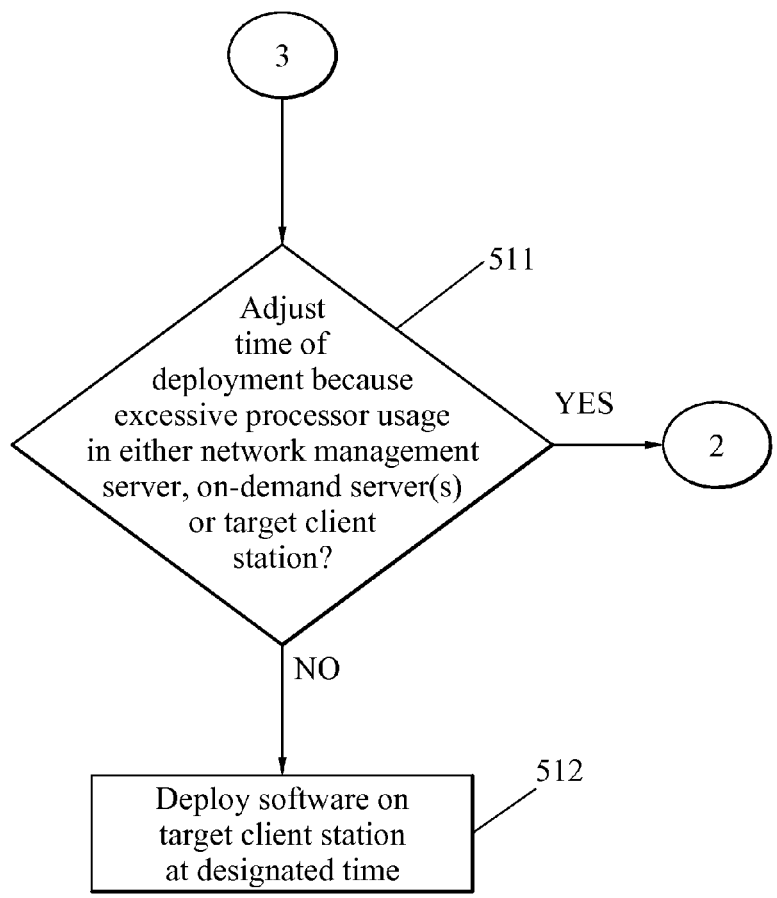

As stated in the Background Information section, by not considering the resource state of the systems involved in the deployment of the software or the environmental conditions, a network management server may deploy an application to a client station when it may be an inopportune time. Hence, if the resource state of the systems involved in the deployment of the software and environmental conditions were taking into consideration, then software may be deployed on the client stations by the network management server more effectively. Therefore, there is a need in the art to deploy software based upon the scheduled time to deploy the software, the dynamic resource state of the systems involved in the deployment of the software as well as based upon the environmental conditions. Network management system 101 is configured to deploy software based upon the scheduled time to deploy the software, the dynamic resource state of the systems involved in the deployment of the software as well as based upon the environmental conditions as described further below in association with FIGS. 4-5. FIG. 4 is a flowchart of a method for deploying software, e.g., update, patch. FIG. 5 is a flowchart of the sub-steps of the step for determining whether to deploy the software (e.g., update, patch) at the schedule time taking into consideration the resource state of the systems (e.g., network management server 101, on-demand servers 102) involved in the deployment of the software as well as based upon the environmental conditions (e.g., bandwidth usage in the connection between network management server 101 and client station 103, time of day pricing for using the connection connecting network management server 101 and client station 103, work order tickets opened on client station 103).

Figure 2:
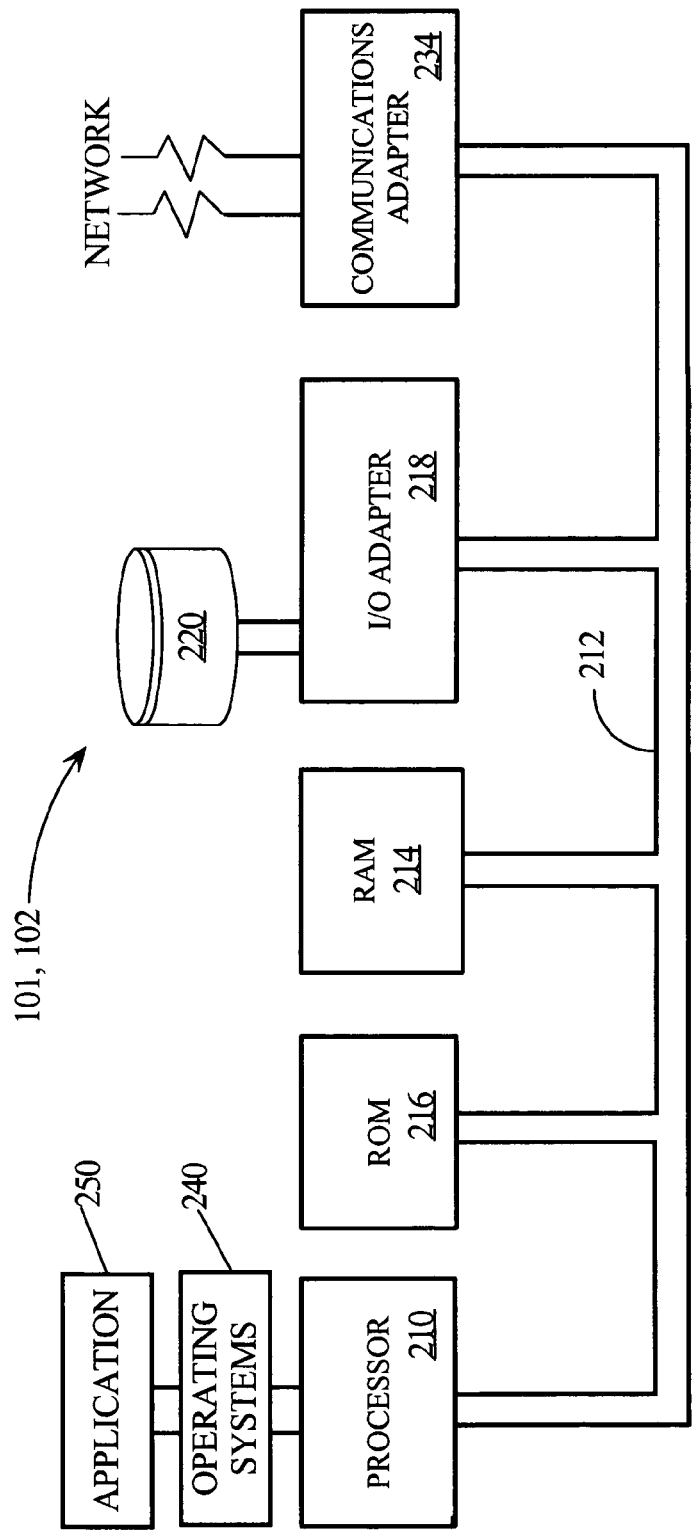
FIG. 2 illustrates an embodiment of the present invention of a network management server and an on-demand server.

FIG. 2—Hardware Configuration of Network Management Server and On-Demand Server

FIG. 2 illustrates an embodiment of the present invention of network management server 101 (FIG. 1) and on-demand server 102 (FIG. 1). Referring to FIG. 2, network management server 101 and on-demand server 102 may comprise a processor 210 coupled to various other components by system bus 212. An operating system 240 may run on processor 210 and provide control and coordinate the function of the various components of FIG. 2. An application 250 in accordance with the principles of the present invention may run in conjunction with operating system 240 and provide calls to operating system 240 where the calls implement the various functions or services to be performed by application 250. Application 250 of network management server 101 may include, for example, a program for deploying software (e.g., patches, updates) on designated client stations 103 (FIG. 3) based upon the scheduled time to deploy the software, the dynamic resource state of the systems involved in the deployment of the software as well as based upon the environmental conditions as discussed in conjunction with FIGS. 4-5.

Referring to FIG. 2, network management server 101, on-demand server 102 may further include a Read-Only Memory (ROM) 216 coupled to system bus 212. ROM 216 may include a basic input/output system ("BIOS") that controls certain basic functions of network management server 101, on-demand server 102. Random access memory (RAM) 214, disk adapter 218 and communications adapter 234 may also be coupled to system bus 212. It should be noted that software components including operation system 240 and application 250 may be loaded into RAM 214 which may be network management server's 101, on-demand server's 102 main memory for execution. Disk adapter 218 may be an integrated drive electronics ("IDE") adapter that communicates with disk units 220, e.g., disk drive. It is noted that the program of the present invention in network management server 101 for deploying software (e.g., patches, updates) on designated client stations 103 based upon the scheduled time to deploy the software, the dynamic resource state of the systems involved in the deployment of the software as well as based upon the environmental conditions, as discussed in conjunction with FIGS. 4-5, may reside in disk unit 220 or in application 250.

Referring to FIG. 2, network management server 101, on-demand server 102 may further comprise a communications adapter 234 coupled to bus 212. Communications adapter 234 of network management server 101 may enable network management server 101 to communicate with on-demand server 102 and client station 103. Communications adapter 234 of on-demand server 102 may enable on-demand server 102 to communicate with network management server 101 and client station 103.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by network management server 101, the set of instructions may be stored as a computer program product in another computer memory, for example, in disk drive 220 (which may include a removable memory such as an optical disk or floppy disk for eventual use in disk drive 220). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
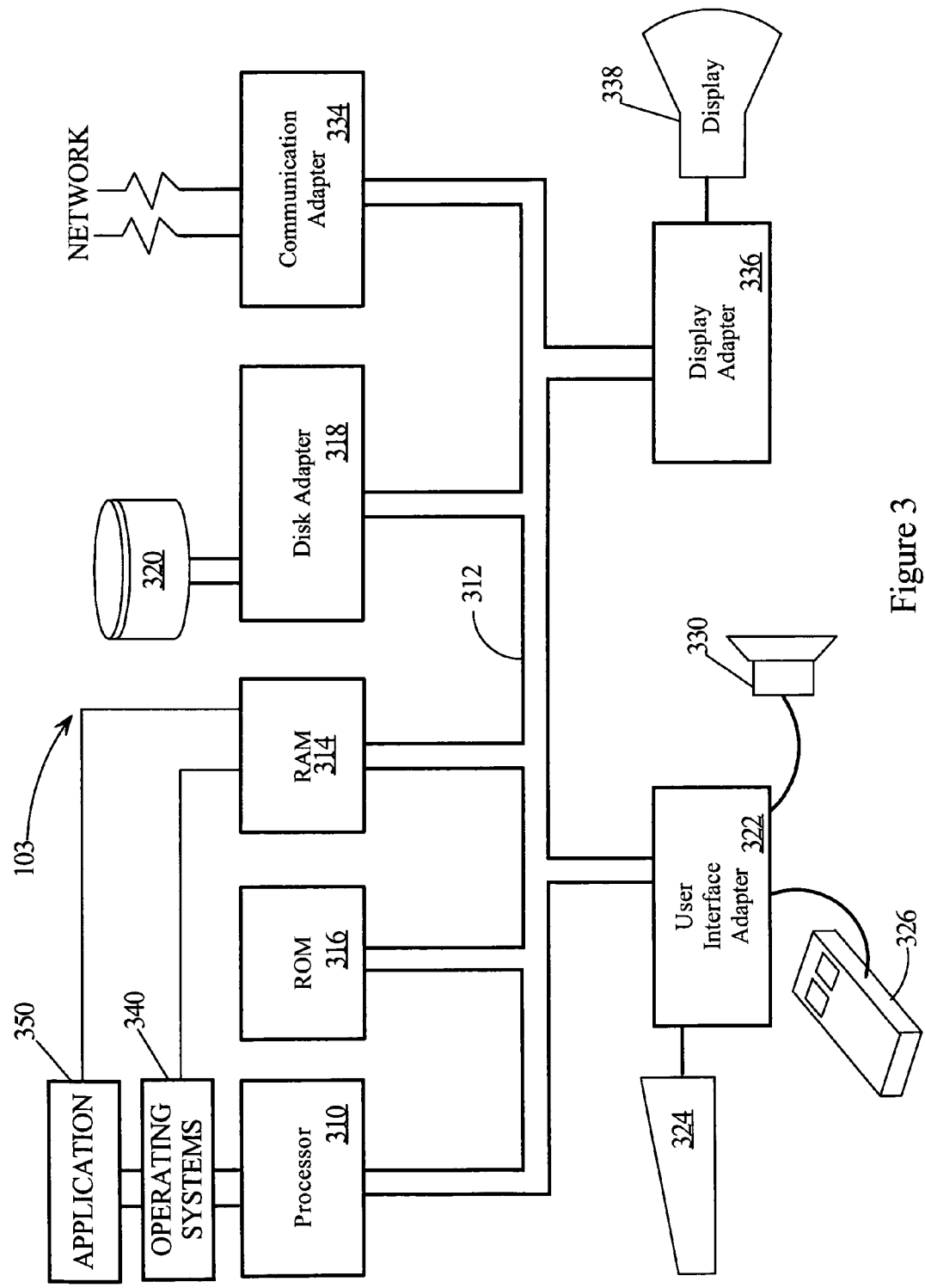
FIG. 3 illustrates an embodiment of the present invention of a client station.

FIG. 3—Hardware Configuration of Client Station

FIG. 3 illustrates a typical hardware configuration of client station 103 (FIG. 1) which is representative of a hardware environment for practicing the present invention. Client station 103 may have a processor 310 coupled to various other components by system bus 312. An operating system 340 may run on processor 310 and provide control and coordinate the functions of the various components of FIG. 3. An application 350 in accordance with the principles of the present invention may run in conjunction with operating system 340 and provide calls to operating system 340 where the calls implement the various functions or services to be performed by application 350. Application 350 may include, for example, a web browser. Read-Only Memory (ROM) 316 may be coupled to system bus 312 and include a basic input/output system ("BIOS") that controls certain basic functions of client station 103. Random access memory (RAM) 314 and disk adapter 318 may also be coupled to system bus 312. It should be noted that software components including operating system 340 and application 350 may be loaded into RAM 314 which may be the client station's 103 main memory for execution. Disk adapter 318 may be an integrated drive electronics ("IDE") adapter that communicates with a disk unit 320, e.g., disk drive.

Referring to FIG. 3, client station 103 may further include a communications adapter 334 coupled to bus 312. Communications adapter 334 may enable client station 103 to communicate on-demand server 102 (FIG. 1) or network management server 101 (FIG. 1). I/O devices may also be connected to system bus 312 via a user interface adapter 322 and a display adapter 336. Keyboard 324, mouse 326 and speaker 330 may all be interconnected to bus 312 through user interface adapter 322. Event data may be inputted to client station 103 through any of these devices. A display monitor 338 may be connected to system bus 312 by display adapter 336. In this manner, a user is capable of inputting to client station 103 through keyboard 324 or mouse 326 and receiving output from client station 103 via display 338 or speaker 330.

As mentioned above, network management system 101 is configured to deploy software based upon the scheduled time to deploy the software, the dynamic resource state of the systems involved in the deployment of the software as well as based upon the environmental conditions as described further below in association with FIGS. 4-5. FIG. 4, as discussed below, is a flowchart of a method for deploying software, e.g., update, patch.

FIG. 4—Method for Deploying Software

FIG. 4 is a flowchart of one embodiment of the present invention of a method 400 for deploying software by network management server 101 (FIG. 1) based upon the scheduled time to deploy the software, the dynamic resource state of the systems involved in the deployment of the software as well as based upon the environmental conditions.

Referring to FIG. 4, in conjunction with FIGS. 1-3, in step 401, network management server 101 receives a request to deploy a software application ("iapplication") on a designated target client station 103, e.g., client station 103A, at a designated scheduled time, e.g., 3 a.m. on Saturday, from an administrator.

In step 402, network management server 101 determines whether to deploy the application to the designated target client station, such as via on-demand server(s) 102, at the scheduled time based on the dynamic resource state (e.g., processor usage) of the systems involved in the deployment of the application (e.g., network management server 101, on-demand server 102) as well as based upon environmental conditions. Environmental conditions may be used to determine how opportune the deployment of the application on the designated target client station 103 is. Examples of environmental conditions include, but not limited to network capability (e.g., bandwidth usage), access (e.g., time of day pricing structure for connectivity,) and performance problems with client stations 103 (e.g., work order ticket to correct a problem that the user of client station 103 is experiencing). Step 402 may includes the sub-steps as illustrated in FIG. 5.

Referring to FIG. 5, in step 501, network management server 101 determines the bandwidth usage in the connection that connects network management server 101, either directly or indirectly, with the target client station 103. In step 502, network management server 101 determines whether to adjust the time of deploying the application on the target client station 103 because of excessive bandwidth usage. If there is excessive bandwidth usage in the connection that connects network management server 101, either directly or indirectly, with the target client station 103, then, in step 503, the time of deploying the application on the target client station 103 is adjusted appropriately. For example, the application may be deployed on the target client station 103 when the bandwidth usage of the connection, that connects network management server 101, either directly or indirectly, with the target client station 103, is less than a threshold.

If, however, there is not excessive bandwidth usage in the connection that connects network management server 101, either directly or indirectly, with the target client station 103, then, in step 504, network management server 101 determines the disk space availability of the target client station 103. In step 505, network management server 101 determines whether to adjust the time of deploying the application on the target client station 103 because of not having enough available disk space on the target client station 103.

If there is not enough available disk space on the target client station 103, then, in step 503, the time of deploying the application on the target client station 103 is adjusted appropriately. For example, the application may be deployed on the target client station 103 when there is enough available disk space on the target client station 103.

If, however, there is enough available disk space on the target client station 103, then, in step 506, network management server 101 determines the time of day pricing for using the connection between network management server 101 and the target client station 103 at the scheduled time for deploying the application. In step 507, network management server 101 determines whether to adjust the time of deploying the application on the target client station 103 because it is too expensive in using the connection between network management server 101 and the target client station 103 at the scheduled time.

If it is too expensive to use the connection between network management server 101 and the target client station 103 at the scheduled time, then, in step 503, the time of deploying the application on the target client station 103 is adjusted appropriately. For example, the application may be deployed on the target client station 103 when the use of the connection between network management server 101 and the target client station 103 is less expensive.

If, however, it is not too expensive to use the connection between network management server 101 and the target client station 103 at the scheduled time, then, in step 508, network management server 101 determines if there are any work orders on the target client station 103 that have not been completed. In step 509, network management server 101 determines whether to adjust the time of deploying the application on the target client station 103 because a work order on the target client station 103 has not been completed.

If there is a work order on the target client station 103, then, in step 503, the time of deploying the application on the target client station 103 is adjusted appropriately. For example, the application may be deployed on the target client station 103 after completion of the work order on the target client station 103.

If, however, there is no work order on the target client station 103, then, in step 510, network management server 101 determines processor usage in the systems involved in the deployment of the software, such as network management server 101, on-demand server 102 (if used to deliver applications to target client system 103) and the designated target client station 103. In step 511, network management server 101 determines whether to adjust the time of deploying the application on the target client station 103 because of excessive processor usage in one of the systems (e.g., network management server 101, on-demand server 102, target client station 103) involved in the deployment of the software.

If there is excessive processor usage in one of the systems involved in the deployment of the software, then, in step 503, the time of deploying the application on the target client station 103 is adjusted appropriately. For example, the application may be deployed on the target client station 103 after the excessive processor usage involved in one of the systems used in the deployment of the software has returned to normal activity.

If, however, there is no excessive processor usage in any of the systems involved in the deployment of the software, then, in step 512, network management server 101 deploys the software on the target client station 103 at the designated scheduled time.

It is noted that method 400 may include other and/or additional steps that, for clarity, are not depicted. It is further noted that method 400 may be executed in a different order presented and that the order presented in the discussion of FIGS. 4 and 5 is illustrative. It is further noted that certain steps in method 400 may be executed in a substantially simultaneous manner. It is further noted that the embodiments of the present invention are not to be limited to the examples of the dynamic resource states of the systems involved in the deployment of the software (e.g., processor usage of network management server 101, processor usage of client station 103) as well as the environmental conditions (e.g., bandwidth usage, time of day pricing for connectivity at scheduled time, work orders on client station 103) described above. These are examples and the present invention may consider other environmental conditions and dynamic resource states of the systems involved in the deployment of the software to determine whether to deploy the software application on client station 103. For example, the present invention may consider whether there is a critical backup process executing at the scheduled time on one of the systems involved in the deployment of the software or the number of users of client stations 103 that are logged onto network system 100 as other resource state evaluations.

Although the method, computer program product and network management server are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for distributing software comprising the steps of:
   receiving a request to deploy an application on a designated target client station at a designated scheduled time;
   determining, by a network management server, whether to deploy said application on said designated target client station at said designated time based on a resource state of said designated target client station and a network management server as well as based on environmental conditions, wherein said environmental conditions are used to determine how opportune said deployment of said application on said designated target client station at said designated scheduled time is; and
   determining if any work orders on said designated target client station have not been completed.

2. The method as recited in claim 1 further comprising the step of:
   determining a bandwidth usage in a connection that connects said network management server with said designated target client station.

3. The method as recited in claim 2 further comprising the step of:
   adjusting a time of deploying said application on said designated target client station if said bandwidth usage in said connection that connects said network management server with said designated target client station is greater than a threshold.

4. The method as recited in claim 1 further comprising the step of:
   determining a time of day pricing for using a connection connecting said network management server with said designated target client station at said designated scheduled time.

5. The method as recited in claim 4 further comprising the step of:
   adjusting a time of deploying said application on said designated target client station if an expense to use said connection at said designated scheduled time exceeds a threshold.

6. The method as recited in claim 1 further comprising the step of:
   adjusting a time of deploying said application on said designated target client station because a work order on said designated target client station has not been completed.

7. The method as recited in claim 1 further comprising the step of:
   determining processor usage in one or more of said network management server and said designated target client station.

8. The method as recited in claim 7 further comprising the step of:
   adjusting a time of deploying said application on said designated target client station because of excessive processor usage in one or more of said network management server and said designated target client station exceeding a threshold.

9. The method as recited in claim 1, wherein said environmental conditions comprises one or more of the following: a bandwidth usage in a connection that connects said network management server with said designated target client station, a time of day pricing for using said connection connecting said network management server with said designated target client station and work order tickets opened on said designated target client station.

10. A computer program product embodied in a computer readable medium for distributing software comprising the programming instructions for:
    receiving a request to deploy an application on a designated target client station at a designated scheduled time;
    determining whether to deploy said application on said designated target client station at said designated time based on a resource state of said designated target client station and a network management server as well as based on environmental conditions, wherein said environmental conditions are used to determine how opportune said deployment of said application on said designated target client station at said designated scheduled time is;
    determining if any work orders on said designated target client station have not been completed; and
    adjusting a time of deploying said application on said designated target client station because a work order on said designated target client station has not been completed.

11. The computer program product as recited in claim 10 further comprising the programming instructions for:
    determining a bandwidth usage in a connection that connects said network management server with said designated target client station; and
    adjusting a time of deploying said application on said designated target client station if said bandwidth usage in said connection that connects said network management server with said designated target client station is greater than a threshold.

12. The computer program product as recited in claim 10 further comprising the programming instructions for:
    determining a time of day pricing for using a connection connecting said network management server with said designated target client station at said designated scheduled time; and
    adjusting a time of deploying said application on said designated target client station if an expense to use said connection at said designated scheduled time exceeds a threshold.

13. The computer program product as recited in claim 10 further comprising the programming instructions for:
    determining processor usage in one or more of said network management server and said designated target client station; and
    adjusting a time of deploying said application on said designated target client station because of processor usage in one or more of said network management server and said designated target client station exceeding a threshold.

14. The computer program product as recited in claim 10, wherein said environmental conditions comprises one or more of the following: a bandwidth usage in a connection that connects said network management server with said designated target client station, a time of day pricing for using said connection connecting said network management server with said designated target client station and work order tickets opened on said designated target client station.

15. A network management server, comprising:
a memory unit operable for storing a computer program operable for distributing software; and
a processor coupled to said memory unit, wherein said processor, responsive to said computer program, comprises:
circuitry for receiving a request to deploy an application on designated target client station at a designated scheduled time;
circuitry for determining whether to deploy said application on said designated target client station at said designated time based on a resource state of said designated target client station and a network management server as well as based on environmental conditions, wherein said environmental conditions are used to determine how opportune said deployment of said application on said designated target client station at said designated scheduled time is;
circuitry for determining if any work orders on said designated target client station have not been completed; and
circuitry for adjusting a time of deploying said application on said designated target client station because a work order on said designated target client station has not been completed.

16. The network management server as recited in claim 15, wherein said processor further comprises:
circuitry for determining a bandwidth usage in a connection that connects said network management server with said designated target client station; and
circuitry for adjusting a time of deploying said application on said designated target client station if said bandwidth usage in said connection that connects said network management server with said designated target client station is greater than a threshold.

17. The network management server as recited in claim 15, wherein said processor further comprises:
circuitry for determining a time of day pricing for using a connection connecting said network management server with said designated target client station at said designated scheduled time; and
circuitry for adjusting a time of deploying said application on said designated target client station if an expense to use said connection at said designated scheduled time exceeds a threshold.

18. The network management server as recited in claim 15, wherein said processor further comprises:
circuitry for determining processor usage in one or more of said network management server and said designated target client station; and
circuitry for adjusting a time of deploying said application on said designated target client station because of processor usage in one or more of said network management server and said designated target client station exceeding a threshold.

19. The network management server as recited in claim 15, wherein said environmental conditions comprises one or more of the following: a bandwidth usage in a connection that connects said network management server with said designated target client station, a time of day pricing for using said connection connecting said network management server with said designated target client station and work order tickets opened on said designated target client station.

\* \* \* \* \*